March 3, 1936.  J. E. PADGETT  2,032,497
UNIVERSAL JOINT
Filed March 13, 1933  4 Sheets-Sheet 1
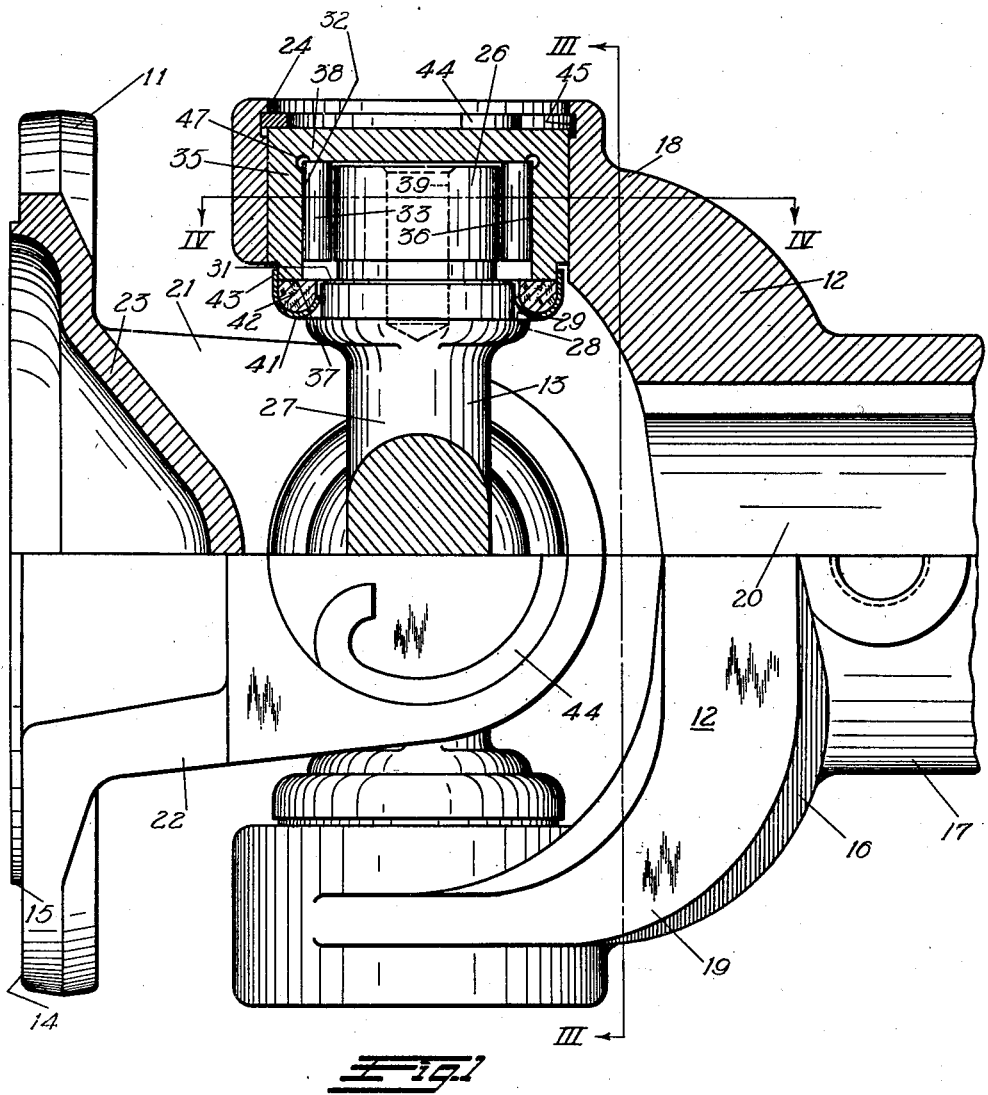
Inventor
Joseph E. Padgett
By Strauch & Hoffman
Attorneys March 3, 1936.　　　J. E. PADGETT　　　2,032,497
UNIVERSAL JOINT
Filed March 13, 1933　　　4 Sheets-Sheet 2
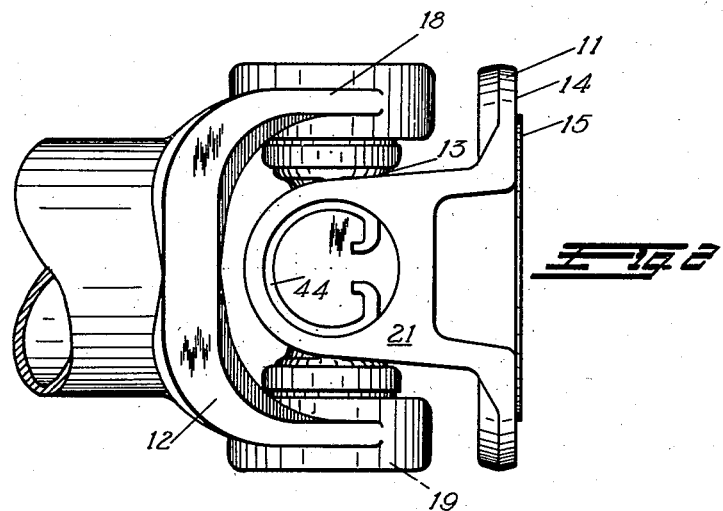
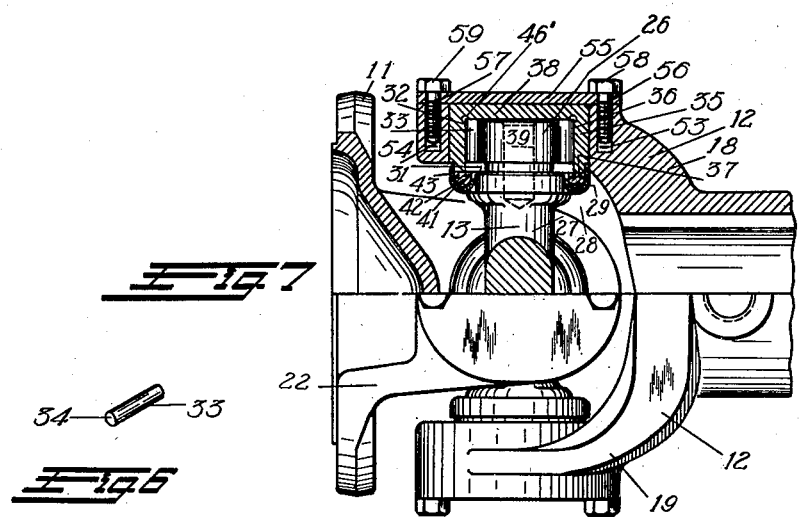
Inventor
Joseph E. Padgett

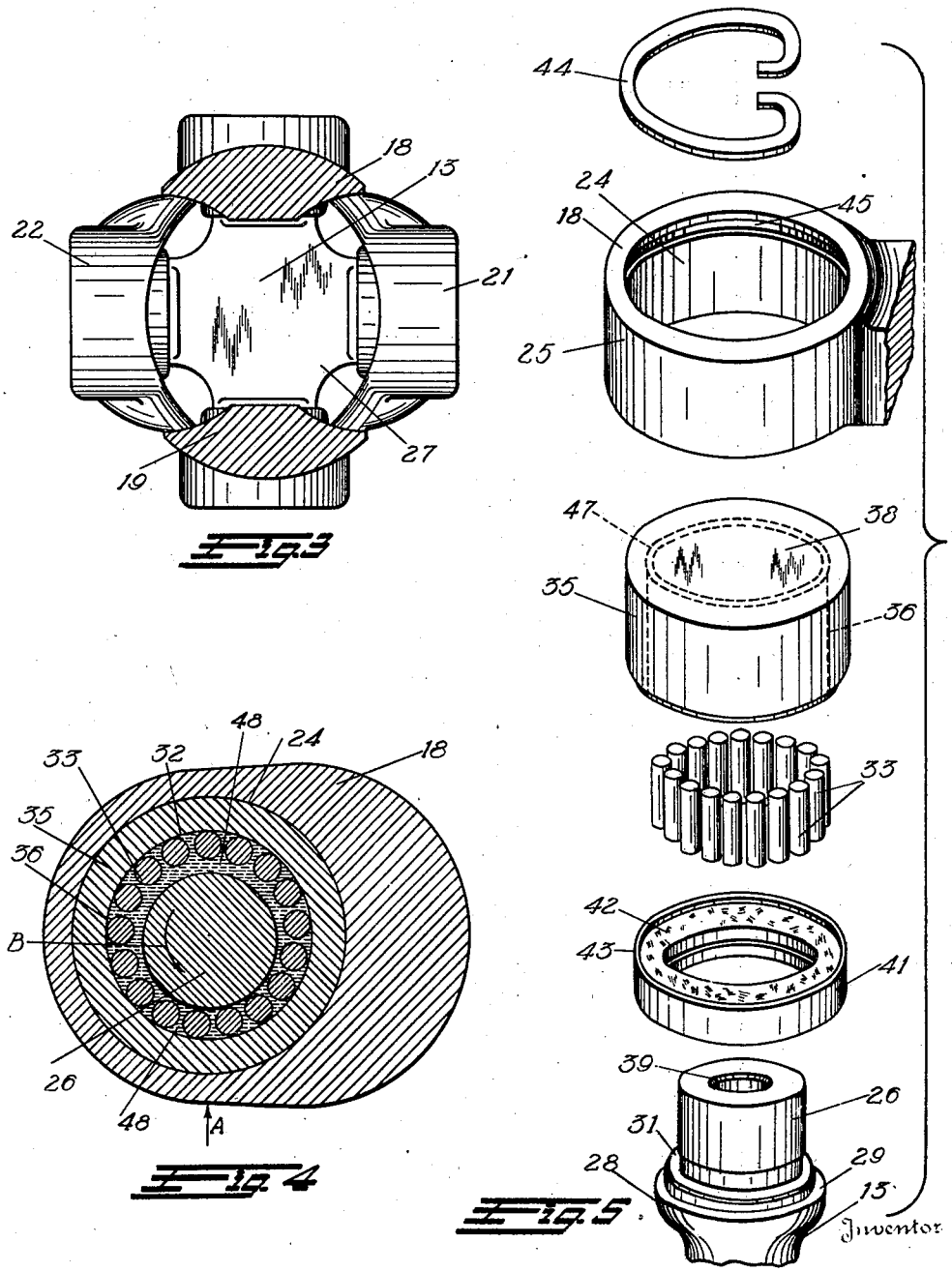

March 3, 1936.  J. E. PADGETT  2,032,497
UNIVERSAL JOINT
Filed March 13, 1933  4 Sheets-Sheet 4
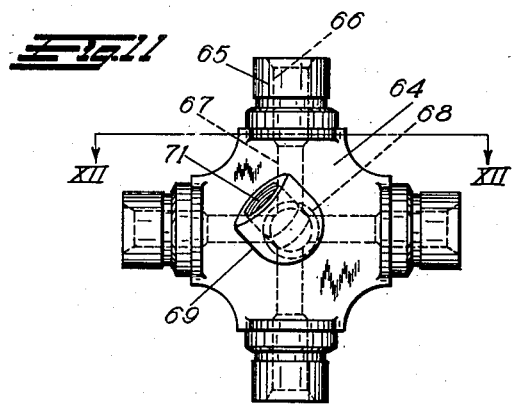
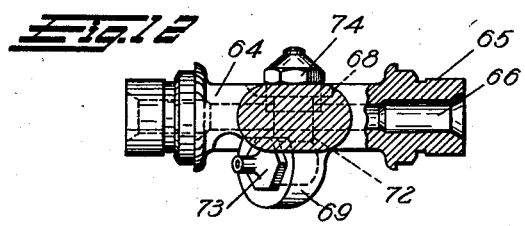
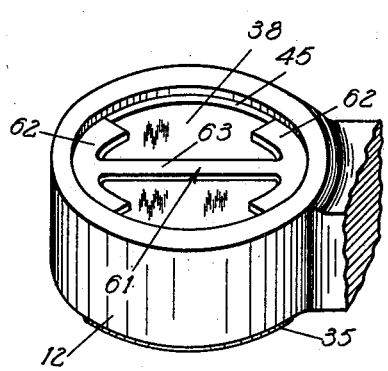
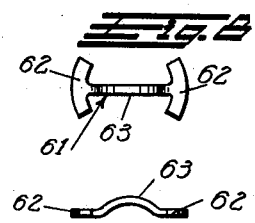
Inventor
Joseph E. Padgett
By Strauch + Hoffman
Attorneys Patented Mar. 3, 1936

2,032,497

UNITED STATES PATENT OFFICE 2,032,497

UNIVERSAL JOINT

Joseph E. Padgett, Toledo, Ohio

Application March 13, 1933, Serial No. 660,594

7 Claims. (Cl. 64—17)

This invention relates to universal joints, and more particularly to universal joints embodying novel types of construction combining novel bearing elements.

Prior universal joints in common use in the automotive industry have been of the so-called cross and ring types. Both types have a number of undesirable characteristics that are eliminated by my present invention.

To permit assembly of the yokes with the trunnions in prior commonly used cross types of joints, it has been necessary to open the ends of the yokes to permit insertion and removal of the trunnions endwise into the yoke sections. The assembly openings weaken the ends of the yokes. To overcome this weakness, the size, thickness and width of the yokes have been necessarily large in comparison to the power transmitted, increasing weight at a substantial distance from the normal axis of the universal joint. The large size of yokes made necessary by the open ended yoke construction requires the use of larger and heavier cross trunnion supporting members than is necessary to transmit the power. In addition bearing elements have been used in such prior constructions which have been capable of transmitting comparatively small unit pressures necessitating a comparatively large span in the joint construction.

Certain types of cross type joints with closed end yokes have also been proposed and have gone into limited use. These joints also have utilized low capacity bearings, necessitating a large span of joint and excessive weight for a given capacity of joint.

In the prior ring types of joints, the trunnions, which are formed on the yoke members, are secured together by an encircling comparatively heavy and necessarily large split ring forming a heavy mass at a comparatively great distance from the center of rotation of the joint.

In all forms, the prior constructions distribute heavy masses at a substantial distance from the normal axis of the universal joint with resultant comparatively large moments of inertia. Since universal joints, in many mechanisms, as for instance, a motor vehicle, are subject to almost constant acceleration and deceleration, reduction of the moment of inertia to a minimum is an important factor in the efficiency of energy transmission and in the life of the joint. In addition the heavy masses of the prior joints increase the violence of whipping or vibration of propeller shafts and substantially decrease the speeds at which undesirable vibration occurs.

The elements associated with prior universal joints sometimes become worn or are displaced relatively so that the joint is caused to rotate eccentrically in a relatively wide circle. If the joint is heavy, this eccentricity becomes a serious factor and trouble often results. For this reason, a minimum weight concentrated around the normal axis of the universal is desirable.

The bearings employed to support the trunnions in the prior joints in common use have been plain bearings formed of polished hard metal bushings, and in the most commonly used forms, have been dependent for their lubrication upon a mass of lubricant retained around the universal joint by a light metal casing. Not only is a high friction factor present which tends to increase wear and tear upon such bearings, limiting the power that may be transmitted thereby and materially shortening the life thereof, but an added expense is involved in the shaping and machining of the yokes to permit the fastening thereover of the lubricant-retaining shell. Gaskets must also be provided to prevent escape of the lubricant and the joint must be inspected from time to time to insure its proper functioning and to add more lubricant. All this involves added maintenance and expense.

In the prior types of joints in which no lubricant retaining casings are utilized, due to the heat generated by the joint action in the bearings used, the alternate heating and cooling causes a temperature variation of approximately 200° Fahrenheit or more under average operating conditions. This temperature variation causes expansion and contraction of air in the lubricant retaining pockets breathing action which rapidly forces the oil out of the joint and compels the use of larger and heavier constructions for a given torque delivery than would be necessary with effective lubrication.

In addition to overcoming the foregoing disadvantages of prior constructions, my invention has, among other objects, the following:

A primary object of my invention is to provide a universal joint of novel design whereby the cost of production is materially lowered, the efficiency and power transmitting capacity per unit of weight of the joint at the same time being increased.

Another object of my invention is to provide a universal joint of minimum mass and weight consistent with the strength required, the mass of the elements of the joint being concentrated closely adjacent the axis of the joint whereby the moment of inertia of the joint is reduced to a minimum.

Another object of this invention is to provide a universal joint having a novel type of bearing associated therewith, said bearing being of a type to greatly reduce operating temperature variations and lubricant expelling breathing, and to greatly increase the efficiency, capacity and life of the joint.

A further object of this invention is to provide a universal joint having a novel type of bearing associated therewith that is self-lubricating during the normal life of the joint, and in which no substantial loss of lubricant occurs through breathing.

It is still a further object of the present invention to provide a universal joint combined with a novel type of bearing, wherein a plurality of separate slidable and rotatable elements are employed as the bearing elements.

A further object of this invention is to provide a universal joint combined with a novel type of bearing wherein a plurality of separate elements are utilized as the primary bearing elements, the elements being so arranged and so formed that they normally slide with respect to the adjacent portions of the bearing, and tend to rotate as the load increases.

A further object of this invention is to provide a novel universal joint having a plurality of yoke members, the yoke members being closed except for apertures allowing the entrance of trunnions about which the yoke members rotate, providing a closed end construction that permits a substantial saving in the amount and weight of material employed in their construction, and providing a much lighter type of universal joint than has been produced heretofore.

Another object of this invention is to provide a universal joint of the closed yoke type with which is associated a novel form of spider serving to connect the yokes and of a design to concentrate the mass thereof closely around the normal axis of the joint, thereby reducing the moment of inertia to a minimum.

A further object of this invention is to provide a novel form of bearing in a universal joint combined with a closed yoke construction, the yoke and the bearing being capable of assembly with a minimum expenditure of time and labor and with minimum cost.

It is still a further object of this invention to provide a novel method of assembly of the universal joint of this invention, whereby the elements of the joint may be easily and quickly assembled without notching or otherwise enlarging the yoke apertures.

It is still another object of this invention to provide a novel combination of a bearing and a trunnion that will operate efficiently over a long period of time when subjected to centrifugal force along a line parallel to the axis of the trunnion.

Other objects and advantages of the present invention will appear from the following description and from the appended claims read in connection with the attached drawings in which:

Figure 1 is a side elevation of a universal joint embodying my invention taken partly in section to illustrate the novel bearing and showing the arms of the connecting yokes arranged respectively at right angles to one another;

Figure 2 is a side elevation of the joint of Figure 1, more clearly illustrating the manner of connecting the yokes;

Figure 3 is an end elevation of the joint of Figure 1, taken partly in section on the line 3—3 of Figure 1 reduced in size and showing the manner of connecting the arms of the yokes by means of a spider positioned within the arms;

Figure 4 is an enlarged plan section of a bearing of my improved universal taken on the line IV—IV of Figure 1 and showing in detail the arrangement and spacing of the contained bearing elements with reference to the trunnion and the external race, and with clearances somewhat exaggerated for purposes of illustration;

Figure 5 is an exploded view in perspective of a yoke together with the bearing elements in the order of their assembly;

Figure 6 is a view in perspective of an individual bearing element showing in detail a manner of finishing the end thereof;

Figure 7 is a side elevation, partly in section, showing a universal joint provided with the bearing of Figure 2 embodying a modified fastening means;

Figures 8 and 9 are plan and side views respectively, of a retaining bar adapted to replace the snap ring retainer shown in Figures 1 and 2;

Figure 10 is a perspective of a portion of the yoke illustrating the manner of using the fastening element of Figures 8 and 9;

Figure 11 is a side elevation of another preferred form of spider having a modified lubricating system incorporated therein.

Figure 12 is a view of the spider of Figure 11 taken on the line XII—XII of Figure 11 with one trunnion shown in section.

With reference to Figure 1 of the drawings, the preferred universal joint of my invention, perfectly formed of a suitable metal, comprises in its simplest form, a yoke 11, a yoke 12 and a spider or cross 13. The most common use of this universal joint is in its connection with the drive shaft of a motor vehicle. Hence, for an example, it will be described in that particular.

Yoke 11 is preferably finished with a flat face 14 formed with a flange 15 to provide for connection to a suitable driving or driven element, not forming a part of this invention and description thereof being omitted. Driving connection may be secured through bolts or other fastening means passed through suitable holes formed in face 14.

Yoke 12, in the present example, has provided thereon a portion 16, welded to or otherwise suitably fastened for driving engagement with a splined tubular member 17, not forming a part of this invention and not to be further described.

Yoke 12 has formed therewith, preferably in an integral manner, two spaced arms 18 and 19 which extend from the body 20 of the yoke, the ends of arms 18 and 19 terminating at a point where they are spaced some distance apart.

Yoke 11 is similarly provided with a pair of spaced arms 21 and 22. Yoke 11 is preferably formed with an angular-shaped reinforcing portion between the spaced arms as for instance protuberance 23, designed to connect arms 21 and 22 for some distance from the body portion of yoke 11. Similarly, the spaced arms of yoke 12 may be reinforced.

The interior portions of the reinforcing protuberances such as protuberance 23 are preferably hollow to minimize the weight of the joint. By so placing the reinforcing portion between the spaced arms of the yokes and giving it an angular shape with the vertex at the outermost point, it has been found possible to eliminate a considerable amount of the material formerly required in a universal joint of like strength and to materially reduce the weight.

At the end of each spaced arm an aperture is provided such as the aperture 24 in arm 18, the apertures in the spaced arms of each yoke being disposed in alignment with one another.

To connect the spaced yoke arms in relatively movable relation, spider 13, (Figure 3) is provided. Spider 13 is preferably of cross shape and has four trunnions formed thereon, such as trunnion 26 (Figure 1), which are arranged at 90° intervals around a main body portion 27, the opposing trunnions being in alignment with one another. The surface of each trunnion 26 is hardened, ground and polished for a purpose to be later described. Trunnions 26 are separated from the main body portion 27 by an integral circular flange 28 having a face 29 and a ledge or step portion 31, the trunnion 26 extending from the center of flange 28.

It will be noted that spider 13 is of a size to fit within the spaced arms of the yokes and that the mass of the spider is symmetrical with respect to and closely concentrated adjacent to the normal axis of the universal, thereby maintaining the moment of inertia of the universal with respect to its normal axis at a minimum.

The aligned apertures in the spaced yoke arms are provided with bearing elements within which the corresponding aligned trunnions are arranged to rotate. Since all the apertures together with their associated bearing elements and trunnions are identical, description will be confined to a single aperture 24 shown in detail in Figure 1.

Apertures 24 are of such size that trunnions 26 can be inserted therein by tilting the cross member with relation to the yokes and when inserted are accommodated therein with an annular space 32 disposed therearound. Within space 32 and disposed adjacent and in annular relation to trunnion 26, is an annulus of individual bearing elements 33. Elements 33 are cylindrical in shape, somewhat resembling a needle, with the ends 34 thereof flattened as shown in Figure 6 to provide a cross-section of maximum area at right angles to the axis of the cylinder; the purpose of flat ends 34 will become apparent as the description proceeds.

While elements 33 may be positioned between trunnion 26 and the inner surface of aperture 24 in the modification illustrated, space 32 is preferably sufficiently large to accommodate a tubular sleeve forming an external bearing race 35. Sleeve 35 is formed with a hardened, ground and polished inner surface 36 which contacts with the sides of cylindrical needles 33 and serves as an outer race therefore. Needles 33, it will be noted, are somewhat shorter than sleeve 35 and free to slide longitudinally in the sleeve under the action of centrifugal force and gravity. This sliding aids in distributing lubricant over the races in operation and in equalizing wear that may occur. One end of race 35 is open at 37 and the opposite end is closed to form a sealing cap designated at 38. Cap 38 is preferably formed integral with race 35, not only to economize on manufacturing costs, but to provide a more perfect lubricant seal for the bearing.

A lubricant reservoir 39 is formed within trunnion 26, extending into the main body portion 27 of spider 13. Pressed in place and abutting face 29 of flange 28 is an annular member 41 having a cup-shaped cross-section as shown in Figure 1. Within the cupped portion of member 41, is fitted a circular gasket 42 of packing material such as cork or the like. It will be noted that in the assembly as illustrated in Figure 1, the lower rim of race 35 rests upon and may slightly press into gasket 42 to insure a sealed fit. Member 41 is further formed with an external lip 43 extending above and telescoping about the lower rim of race 35 to provide a more effective seal. By reason of lip 43 and packing 42, foreign matter cannot enter the bearing in operation, since its entry is opposed by centrifugal force.

When trunnion 26, bearing elements 33 and race 35 are assembled within aperture 24, movement of the bearing assembly away from the axis of the universal joint under the influence of centrifugal force is prevented by the ends of elements 33 contacting with cap 38, a small space being preferably allowed between the end of trunnion 26 and cap 38 for the passage of lubricant from lubricant reservoir 39 to elements 33. Movement of cap 38 away from the axis of the universal joint is prevented by the provision of a snap ring 44 arranged to fit within a recess 45 formed in the internal surface of aperture 24. Snap ring 44 is of sufficient inherent resiliency to retain its position within recess 45 and is of sufficient width to project beyond recess 45 and engage the top of cap 38, thereby preventing its outward displacement away from the axis of the universal. Ready removal and replacement of the resilient ring 44 is facilitated by turning the spaced ends 46 inwardly as shown on Figures 1 and 5 of the drawings so that they may be simultaneously grasped by a pair of pliers or a similar tool to contract the ring whereupon it may be readily withdrawn from or snapped into the recess 45. Movement of the bearing assembly toward the axis of the universal is prevented by contact of the rim of race 35 with gasket 42 held in position by member 41.

A circular recess 47 is provided adjacent the junction of race 35 and cap 38 to store and distribute lubricant and to form a grinding clearance. The lubricant is prevented from escaping at the interior end of needles 33 by gasket 42 cooperating with the lower rim of race 35. Lip 43, extending above the lower edge of race 35 and gasket 42, prevents the ingress of dirt and moisture to the bearing as well as loss of lubricant therefrom.

With specific reference to Figure 4, it will be noted that annular space 32, defined by race 35 and trunnion 26, is of a width slightly larger than the diameter of the contained needles 33, providing a clearance between the needles and the races which must be sufficiently greater than normally used in roller bearing practice, to permit the needles to be out of contact with the inner race on the unloaded side of the trunnion when they are forced against the outer race in operation, as will more fully hereinafter appear, to prevent a normal roller bearing action from occurring, which must be avoided if the joint is to operate properly. Deformation of the outer race is necessary to bring a substantial number of needles into load carrying contact with the trunnions because the necessary radial clearance between the races and the needles results in a greater curvature of trunnion surface than the curvature of the surface of tangency of the needles, and the outer race 35 is designed to permit such deformation.

Likewise, it will be noted that the needles 33 are of such diameter with reference to the area of annular space 32 that a small space is defined between each individual needle. Owing to minute irregularities of the needles and races, the needles may tend to skew while under load, and this aggregate space in practice must be sufficient to permit the axes of the needles to return to parallel alignment after skewing when the load pressure thereon is relieved. The aggregate clearance between the needles should preferably be less than a whole needle, and I prefer to make it sufficiently small so that when the needles and outer race are coated with lubricant as designated at 48, the needles will stay in place when assembled in the outer race with the trunnion removed and the race resting on its side for a purpose that will more fully hereinafter appear.

The proper clearances form a distinct and important part of the present invention and their functions will now be described in detail.

It will be noted that unlike the common type of roller or ball bearings, no cage or retainer is provided within which the bearings are supported in spaced relation and are free to rotate. The omission of the cage permits the use of a considerably greater number of load supporting rollers, materially increasing the bearing pressures that may be transmitted in a given size bearing. This in turn permits a material reduction in the span and size of joint necessary to transmit a given power, and reduces the weight of the universal at a point far removed from its axis and consequently reduces the moment of inertia around the axis.

It will also be noted that omission of a cage enables the lubricant coated needles to contact one with another along lines extending their entire length. This contact together with the contact with the lubricant coated races tends to retard rotation of the needles about their own axis to a great extent. With the proper lubricant, and clearances, the bearing becomes a sliding bearing and the individual needles cooperate to form a sliding or creeping sleeve or bushing between the races, the elements of which tend to rotate under load.

The flat-finished ends 34 of needles 33 during rotation of the universal are thrown outwardly against the interior surface of cap 38 of race 35 by centrifugal force and by reason of the relatively high friction factor developed, rotation of the individual needles is retarded and the formation of the sliding or creeping sleeve is aided.

A further important factor entering into the formation of the sliding sleeve or bushing is the presence of proper lubricant within the bearing. A lubricant of the proper consistency, preferably a heavy, more or less viscous lubricant such as is used in automotive transmissions and axle differentials, is placed within the bearing at the time of its assembly, the lubricant reservoir 39 also being filled. By reason of the clearance allowed between the individual needles 33, trunnion 26 and external race 35, a series of small triangular-shaped spaces approximating capillaries in size are formed which tend to retain the lubricant in contact with all portions of the needles. Because of the cohesion between the lubricant particles and the adhesion between the lubricant and the needles and adjacent races, the sleeve formed by the needles tends to become an integral sliding unit, the unity being broken only upon the application of a load, which causes the needles under load to rotate about their own axes.

Under a heavy, applied load the force of the load is not concentrated upon a few needles, but is distributed over a substantial number of needles due to the race deformation and lubricant effect.

For example, referring to Figure 4, let it be assumed that the load is applied at the point designated by arrow A, by either the trunnion or the yoke becoming the driving member. By reason of the proper clearance between the needles, proper lubrication, proper clearance between the races, and proper outer race design, the needles are coated with lubricant and preferably spaced thereby sufficiently to take up the aggregate clearance between the needles, and the lubricant coated needles are brought into contact one with the other.

The needles and lubricant are formed into wedges on opposite sides of the center of the pressure zone by the load application, the extent of the wedges varying to a maximum of approximately ninety degrees on each side of the center of the pressure zone to bring a substantial number of the needles into load supporting contact.

The analysis, so far, has been made with the assumption that there is no relative trunnion rotation. With no relative rotation between the trunnion and yoke, there would be no rotation of the needles and no shifting or creeping. Assuming that there is relative rotation of the trunnion and yoke accompanying the application of pressure in Figure 4, the direction of rotation of the trunnion being counterclockwise as indicated by the arrow B, there is a tendency for the trunnion to roll over the rollers immediately to the left of arrow A, creating what I term a front pressure zone in the sleeve composed of needles and lubricant to the left of arrow A and a rear pressure zone immediately to the right of arrow A, both zones being of wedge shape under the influence of the load, the small ends of the wedges being disposed adjacent the point of pressure application.

As the trunnion rotates relatively, it tends to roll up on the rollers and the pressure is relieved on the rear wedge and increased on the front wedge. Because of the lubricant film, the needles in the front zone tend to slide and pass from under the advancing trunnion contact area and to seek a position of less pressure. They accordingly creep and slide as a unit in a counterclockwise direction until the lubricant film breaks down between the needles under pressure and the races so that a sufficient friction factor is developed therebetween to cause one or more of the needles to roll about their own axes and to pass from the front pressure zone to the rear pressure zone. Because of the minute variations in needle diameter, lubricant distribution and other factors, a variable creeping of the sleeve or rollers with variable rotation of the needles under load occurs.

As the relative rotation reverses with a reversal of oscillation of the joint, creeping of the rollers in the opposite direction will occur. This variable reverse creeping, occurring in accordance with the oscillation of the trunnion causes a constant change in position of the needles with the result that in practice it is found that the wear on the needles is equally distributed and the life of the bearing materially prolonged. It will be noted that the position of the needles with reference to the races is constantly changing so that the wear upon the races is evenly distributed, thereby removing any danger of the needles lapping themselves or forming grooves in either trunnion 26 or race 35, such as occurs when ordinary roller bearings are used in universal joints.

Because of the large number of small rollers that support heavy loads at all times with my improved universal joint, giving a comparatively large number of supporting elements, and the continual change of rollers due to the creeping action secured, my improved universal joints will transmit from five to six times as much load as joints of equal size using plain bearings, with greater efficiency and longer life. In addition, the frictional resistance to rotation and the heat generated are materially reduced as compared to other types of joints. As a result, insufficient temperature variations occur in practice to cause expulsion of lubricant by alternate expansion and contraction of air in lubricant receiving pockets 39, thereby permitting the joints to be packed with lubricant in the original assembly providing lubricant for the normal life of the joint.

My improved joint construction lends itself to a method of assembly that has proven highly efficient and has materially reduced the total cost of the joint, and which will hereinafter be described. My improved closed end yoke construction as herein described possesses a great advantage since the amount of material used in the construction of the yoke is reduced and the weight of the joint lessened. Moreover, all material used in the end of the yoke is at a point farthest removed from the normal axis of the universal, hence, a reduction in the quantity of such material has a marked effect in reducing the moment of inertia, and the vibration and whip of a propeller shaft embodying such joints.

With specific reference to Figure 5 wherein the various elements of the bearing are shown in perspective, for the purpose of illustrating my improved assembly method, yoke 18 is provided with aperture 24 of a size to accommodate the bearing elements. To assemble the joint, yoke 18 need not be split, notched or otherwise enlarged with an accompanying weakening. On the contrary, a tying together of the metal at the portion of the yoke indicated at 25 in tension, as is preferably done in the construction thereof, provides an exceedingly strong structure which, in spite of its light weight and smaller size, is of greater strength than former universal joints of approximately twice its weight.

In the preferred method of assembling my improved universal, spider 13 is placed between the spaced arms of a yoke so that aligned trunnions 26 with gaskets 41 thereon enter aligned apertures 24 formed in the arms of the yokes. As apertures 24 preferably do not function as bearing surfaces, the surfaces thereof need not be smoothed or polished beyond insuring a reasonably tight fit for races 35.

Referring to Figure 5, member 41 is fitted upon concave face 29 of flange 28, trunnion 26 now being placed within aperture 24 and lubricant reservoir 39 filled with comparatively heavy lubricant which may be chilled to harden it somewhat for assembly purposes.

Lubricant is placed within race 35 and an excess number of needles 33 placed therein. Upon shaking or subjection to centrifugal force, the required number of needles 33 coated with lubricant are deposited in an annular arrangement around interior face 36 of race 35. The excess needles are then readily removed. Due to the clearance desired between the needles, they are readily assembled within race 35 and when in place are retained in position by the adhering lubricant. The race 35 may then be conveniently turned upon its side without the needles changing position when my preferred needle clearances are used.

Race 35 with needles 33 therein is then placed over trunnion 28 by insertion into aperture 24. Snap ring 44 is now snapped into recess 45 to hold race 35 in place, ring 44 bearing against cap 38. The opposite trunnion is then similarly assembled.

The second yoke is now positioned with its aligned apertures enclosing the remaining trunnion or spider 25 and bearing elements introduced therein as described above. It will be noted in this particular that no enlarging or splitting of apertures 24 of the second yoke is required due to the compactness and comparative size of the yokes and the spider, and a convenient low cost method of assembly is provided.

In Figure 7, a modified form of the universal joint of this invention has been illustrated, a portion thereof having been sectioned to more clearly show the bearing construction. Since, in many respects, this modification resembles the universal already described in connection with Figure 1, description of the corresponding parts thereof will be omitted, they being designated by corresponding reference numerals.

The main distinction lies in the manner of holding the bearing element in position. While in the lighter types of universal joints, particularly joints used in passenger cars, the snap ring means of fastening has proven highly satisfactory, a different means of fastening has been found more suitable for trucks and heavy duty work. Such a fastening is shown in Figure 7.

The yoke, spider and contained bearing assembly may be the same as that described in connection with Figure 1, except that yoke arm 18 has located therein on opposite sides of aperture 24, threaded holes 53 and 54. A cover plate 55 is provided of sufficient size to cover the aperture 24 and project over the adjacent portions of the yoke arm, cover plate 55 being formed with openings 56 and 57 through which bolts 58 and 59 pass into threaded openings 53 and 54 to secure the cover plate in position.

Yoke arm 18 is so dimensioned that cap 38 of race 35 will abut against the underside of plate 55 and be held thereby.

In Figures 8 and 9, a further modified form of retaining member is illustrated. This member 61 comprises two arcuate-shaped segments 62 connected by an arched bar 63, the member being preferably formed integral. Segments 62 are shaped to substantially conform to the inner surface of recess 45 in yoke 12 as shown in Figure 10 and arm 63 is of a length such that when in the same horizontal plane as segments 62, the retainer 61 will be of a length substantially equal to the diameter of recess 45. The manner of employing retainer 61 is evident from Figure 10. After the bearing has been assembled and cap 35 put in place, retainer 61 is positioned with segments 62 facing recess 45 in the yoke. Bar 63 is tapped or pressed to force it down into the same plane as segments 62 whereupon it exerts a toggle action on segments 62 and forces them into recess 45, securing cap 35 in position. When it is desired to remove the bearing, bar 63 need only be bent upwardly as by a screwdriver, or like tool, and segments 62 will be withdrawn from recess 45 permitting cap 35 to be removed.

Retainer 63 may be formed of spring material and suitably dimensioned so that when compressed, it can be inserted in yoke 12 and upon release of the compression, segments 62 will be forced into recess 45 to hold cap 35 in position.

In some uses of universal joints, such as on heavy trucks or buses, where the mileage is relatively great as compared to the average pleasure vehicle, it is desirable to provide means whereby lubrication of the bearings of the joint is even more positive and may be readily inspected. The spider of Figures 11 and 12 has been developed to fill such a requirement. Spider 64 closely resembles spider 13 of Figure 1 with the exception that trunnions 65 have lubricant reservoirs 66 which are connected at their inner ends with passages 67. Passages 67 leading from the respective trunnions extend through spider 64 and intersect at approximately the center of the spider. At the intersection, spider 64 is drilled and tapped to provide a threaded opening 68, which leads directly from the intersection of passages 67 to one side of the spider. A protuberant or L-shaped lug 69 is formed on the opposite side of the spider and is drilled and threaded to provide a threaded hole 71 connecting with an L-shaped passage 72 to the intersection of passages 67.

A suitable lubricant fitting 73 is screwed into opening 71 through which lubricant may be introduced into passages 67 and passed therefrom into the respective bearings. To insure the expulsion of air and to ascertain when the joint is filled with lubricant, a relief valve 74 is provided in hole 68 and is set to open at a designated pressure. Obviously, by reason of the centrifugal force to which the spider is subject, an almost constant force will be operating upon the lubricant in passages 67 to force it into the trunnion bearings thus aggregating all air and empty space at the intersection of the passages where it may be expelled through the relief valve. By locating both the lubricant fitting and the relief valve at the approximate center of the spider where the centrifugal force, due to rotation of the joint, is at its minimum, there is no tendency for the lubricant to escape either through the fitting or the relief valve and the force is utilized to distribute the lubricant to the trunnions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a universal joint, the combination of a plurality of relatively movable members including a member having a pair of substantially aligned openings therein and a second member having a pair of trunnions extending outwardly into said openings, bearing cups disposed in said openings around said trunnions and closing said openings outwardly of the trunnions therein, a sleeve of independent needles between each of said cups and trunnions, a channel containing an annular packing surrounding the base of each trunnion, said channel opening toward the adjacent bearing cup, said cups having end portions projecting inwardly from the openings in which said cups are disposed substantially beyond said needles and extending into the channels and engaging said packings, and retaining means providing abutments to retain the same in said openings and maintain the inwardly projecting end portions of the cups against the packings in said channels and with the needles free to move longitudinally in the cups.

2. In a universal joint, the combination of a plurality of relatively movable members including a member having a pair of substantially aligned openings therein and a second member having a pair of trunnions extending outwardly into said openings, bearing cups disposed in said openings around said trunnions and closing said openings outwardly of the trunnions therein, said bearing cups being removable from said openings by outward movement substantially in the direction of the axes of said trunnions, a sleeve of needles within each cup free of attachment to the cup and to each other, a channel containing an annular packing surrounding the base of each trunnion opening toward the adjacent bearing cup, said cups having end portions projecting inwardly from the openings in which said cups are disposed beyond said needles and extending into said channels until said packings engage the inwardly projecting ends of the cups, and snap rings in said openings outwardly of said cups providing abutments engaging the cups and removably retaining the same in said openings with the inwardly projecting end portions of the cups against the packings in said grooves and within said channels.

3. In a universal joint, the combination of a plurality of relatively movable members including a member having a pair of substantially aligned openings therein and a second member having a pair of trunnions extending outwardly into said openings, bearing cups disposed in said openings around said trunnions and closing said openings outwardly of the trunnions therein, a sleeve of freely movable needles disposed in each of said cups and free of attachment thereto, abutment means on said second member at the base of each trunnion, a shell containing an annular packing surrounding each trunnion and disposed in engagement with said abutment means, each shell providing a groove opening toward the adjacent bearing cup, said cups having end portions projecting inwardly from said openings beyond said needles and extending into said grooves and engaging said packing, and retaining means cooperating with the first named member and said cups and contacting with said cups and said first named member to retain said cups in said openings and to locate said second member in a predetermined positive relation with respect to the axis of rotation of the first named member.

4. In a universal joint, the combination of a plurality of relatively movable members including a member having a pair of substantially aligned openings therein and a second member having a pair of trunnions extending outwardly into said openings, bearing cups containing a sleeve of needles disposed in said openings around said trunnions and free of attachment with said cup, the bottom walls of the cups locating the trunnions with respect to the center of the joint, said bearing cups and needles being removable separately from said trunnions by outward movement substantially in the direction of the axes of said trunnions, abutment means on said second member just inwardly of each trunnion, said cups having end portions projecting inwardly from the openings in which said cups are disposed beyond said needles, packings between said abutment means and the end portions of said cups out of contact with said needles, shells covering said packings and lapping the end portions of said cups, and resilient means engaging the cups and said first named member to removably retain the same in said openings to locate said trunnions in said cups with the inwardly projecting end portions of the cups within said shells bearing against said packings.

5. In a universal joint, means provided with an aperture; means provided with a trunnion extending into said aperture; a bearing mounted within said aperture and arranged to support said trunnion and comprising a cup and a plurality of independently movable cylindrical needles arranged within said cup in annular relation with respect to said trunnion, said needles being shorter than the cylindrical wall of said cup and free of attachment thereto; a shoulder at the base of said trunnion, a packing between said shoulder and the edge of said cup, and a sheet metal sleeve covering said packing and lapping the butt joint between the edge of said cup and said packing.

6. In a universal joint, the combination of a plurality of relatively movable closed end yokes provided with apertures; a spider connecting said yokes; a plurality of trunnions mounted upon said spider and positioned within said apertures; a bearing within each of said apertures and supporting the corresponding trunnion, and comprising a cup and a plurality of cylindrical needles of a length less than that of the cylindrical wall of said cup and of a size providing capillary lubricant spaces between them, said needles being arranged within said cup in annular relation with respect to said trunnion and free of attachment to said cup; lubricant in said bearing surrounding said needles; a lubricant storing pocket arranged to maintain a proper supply of lubricant in said bearing, and packing means for sealing each bearing extending inwardly of the edge of said cup, said packing means being spaced from said needles whereby the latter can shift longitudinally in said cup.

7. In a universal joint, a connection and bearing between a trunnion having a shoulder at its base and a member provided with an opening larger than said trunnion and extending completely through said member, comprising a cup slid in said opening and having its end wall in contact with the end of said trunnion and its cylindrical wall externally in engagement with the wall of said opening and internally spaced from said trunnion, a sleeve of needles free of attachment to said cup and to each other disposed in the space between said trunnion and said cylindrical wall, said needles having a length substantially less than the length of said last named wall measured from the bottom of the cup to the edge of said wall, sealing means disposed between said shoulder of the trunnion and the edge of said wall, and resiliently engaging said member and means providing a removable abutment rigidly holding the edge of said cup in contact with said sealing means and preventing endwise movement of said cup in said opening and thus retaining said needles in operative position between said trunnion and the cylindrical wall of said cup.

JOSEPH E. PADGETT.

DISCLAIMER 2,032,497.—*Joseph E. Padgett*, Toledo, Ohio. UNIVERSAL JOINT. Patent dated March 3, 1936. Disclaimer filed July 12, 1939, by the patentee.
Hereby enters this disclaimer to claim 1 in said specification.
[*Official Gazette August 8, 1939.*]